(12) United States Patent
Yang et al.

(10) Patent No.: US 12,000,175 B2
(45) Date of Patent: Jun. 4, 2024

(54) DOOR LOCK, DOOR LOCK CONTROLLING METHOD AND DOOR LOCK CONTROLLING DEVICE (71) Applicant: GREE ELECTRIC APPLIANCES, INC. OF ZHUHAI, Qianshan Zhuhai (CN)

(72) Inventors: Miao Yang, Zhuhai (CN); Lei Peng, Zhuhai (CN); Daoyuan Chen, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 813 days.

(21) Appl. No.: 17/053,730

(22) PCT Filed: Dec. 13, 2018

(86) PCT No.: PCT/CN2018/120952
§ 371 (c)(1),
(2) Date: Nov. 6, 2020

(87) PCT Pub. No.: WO2019/214232
PCT Pub. Date: Nov. 14, 2019

(65) Prior Publication Data
US 2021/0214970 A1  Jul. 15, 2021

(30) Foreign Application Priority Data
May 9, 2018  (CN) .......................... 201810436461.1

(51) Int. Cl.
E05B 47/00  (2006.01)
G05B 19/042  (2006.01)
G07C 9/00  (2020.01)

(52) U.S. Cl.
CPC ........ *E05B 47/0001* (2013.01); *G05B 19/042* (2013.01); *E05B 2047/0056* (2013.01); *G07C 9/00563* (2013.01)

(58) Field of Classification Search
CPC ......... E05B 47/0001; E05B 2047/0056; G05B 19/042; G07C 9/00563
See application file for complete search history.

(56) References Cited

U.S. PATENT DOCUMENTS 9,530,295 B2 * 12/2016 Johnson ................ H04N 7/181
2006/0000247 A1    1/2006 Moon et al.
(Continued)

FOREIGN PATENT DOCUMENTS

CN    2797546 Y    7/2006
CN    102322185 A    1/2012
(Continued)

OTHER PUBLICATIONS

Extended European Search Report mailed Nov. 8, 2021, issued in corresponding European Application No. EP 18917804.9, 10 pages.
(Continued)

*Primary Examiner* — Mark A Williams
(74) *Attorney, Agent, or Firm* — Christensen O'Connor Johnson Kindness PLLC (57) ABSTRACT

The present disclosure discloses a door lock, a door lock controlling method and a door lock controlling device. The door lock includes a main controlling module, an unlocking module and a sensing module. The sensing module is configured to determine whether a human body is present within a first preset detection range; if yes, the main controlling module and the unlocking module are controlled to be powered on; and if no, the main controlling module and the unlocking module are controlled to be powered off. In the present disclosure, only the sensing module is in an
(Continued)

operating state and other modules are not powered on when there is no user who is trying to open the door. Therefore, the power consumption of the door lock is reduced.

16 Claims, 3 Drawing Sheets

(56) References Cited

U.S. PATENT DOCUMENTS

| | | | |
|---|---|---|---|
| 2008/0088412 A1 | 4/2008 | Cromer et al. | |
| 2015/0059248 A1* | 3/2015 | Iwata | E05F 15/73 49/506 |
| 2015/0128667 A1* | 5/2015 | Yoon | E05B 65/104 70/278.1 |
| 2015/0213663 A1 | 7/2015 | Dumas et al. | |
| 2016/0189460 A1* | 6/2016 | Watanabe | G05B 15/02 700/275 |
| 2017/0024996 A1 | 1/2017 | Nold | |
| 2017/0191287 A1* | 7/2017 | Mittleman | E05F 15/72 |
| 2017/0263067 A1* | 9/2017 | Scalisi | G07C 9/25 |
| 2018/0283051 A1* | 10/2018 | Qiu | G06K 19/0723 |
| 2019/0213817 A1* | 7/2019 | Wechsler | G07C 9/00904 |
| 2020/0080342 A1* | 3/2020 | Li | E05B 47/0046 |
| 2020/0123810 A1* | 4/2020 | Gao | G01D 5/145 |
| 2020/0150508 A1* | 5/2020 | Patterson | B32B 27/36 |
| 2020/0265662 A1* | 8/2020 | Maiga | G07C 9/00174 |
| 2020/0372735 A1* | 11/2020 | Chang | B60K 35/00 |

FOREIGN PATENT DOCUMENTS

| | | |
|---|---|---|
| CN | 103291135 A | 9/2013 |
| CN | 105672845 A | 6/2016 |
| CN | 205644159 U | 10/2016 |
| CN | 107339018 A | 11/2017 |
| CN | 107386811 A | 11/2017 |
| CN | 107489308 A | 12/2017 |
| CN | 107680224 A | 2/2018 |
| CN | 107762282 A | 3/2018 |
| CN | 107989480 A | 5/2018 |
| CN | 108691458 A | 10/2018 |
| IN | 107204059 A | 9/2017 |
| KR | 20010070625 A * | 7/2001 |
| KR | 20030033849 A | 5/2003 |

OTHER PUBLICATIONS

International Search Report mailed Mar. 18, 2019, issued in corresponding International Application No. PCT/CN2018/120952, filed Dec. 13, 2018, 5 pages.

* cited by examiner

DOOR LOCK, DOOR LOCK CONTROLLING METHOD AND DOOR LOCK CONTROLLING DEVICE

CROSS-REFERENCE TO RELATED APPLICATIONS

This application claims priority benefits from China Patent Application No. 201810436461.1, filed on May 9, 2018, entitled "DOOR LOCK, DOOR LOCK CONTROLLING METHOD AND DEVICE", the content of which is hereby incorporated by reference. This application is a 35 U.S.C. § 371 national application of international patent application PCT/CN2018/120952 filed on Dec. 13, 2018, the content of which is also hereby incorporated by reference.

TECHNICAL FIELD

The present disclosure relates to a field of smart-home technology, in particular, to a door lock, a door lock controlling method, and a door lock controlling device.

BACKGROUND

Different from traditional mechanical locks, smart door locks are composite locks with safety, convenience and advanced technology. A user can trigger the smart door lock in at least one way, such as pressing a doorbell, keyboard input, fingerprint recognition, and moving a door handle. The trigger ways are various. According to conventional ways of controlling the smart door lock, the user usually lock and unlock the door lock by keyboard input, fingerprint recognition, or through remote terminal. This requires a controlling module of the door lock to always be in a power-on state to ensure that the user can control the door lock in time. However, the door lock in the power-on state consumes a lot of power, causing a problem of high power consumption of the smart door lock.

SUMMARY

The present disclosure provides a door lock, a door lock controlling method, and a door lock controlling device.

An embodiment of the present disclosure provides door lock including a main controlling module, an unlocking module, and a sensing module.

The sensing module is configured to determine whether a human body is present within a first preset detection range; if yes, the sensing module is configured to control the main controlling module and the unlocking module to be powered on; and if no, the sensing module is configured to control the main controlling module and the unlocking module to be powered off.

Optionally, the main controlling module is connected to the unlocking module. The main controlling module is configured to receive an unlocking instruction of a person who is trying to open a door sent by the unlocking module, and determine whether unlocking information carried in the unlocking instruction is consistent with target unlocking information that is pre-stored in the main controlling module; if yes, the main controlling module is configured to control the unlocking module to unlock; and if no, the unlocking module is kept in a locked state.

In the door lock according to embodiments of the present disclosure, the sensing module controls the main controlling module and the unlocking module to be powered off when sensing that no human body is present within the first preset detection range, thereby ensuring that only the sensing module is in an operating state and other modules are not powered on when there is no person who is trying to open the door, on the premise of not affecting a normal control of the door lock. Therefore, the power consumption of the door lock is reduced.

Optionally, the door lock further includes a first switch connected between the main controlling module and the sensing module;
  wherein the sensing module is specifically configured to control the first switch to be closed when sensing that a human body is present within the first preset detection range, and to control the first switch to be open when sensing that no human body is present within the first preset detection range.

The door lock according to embodiments of the present disclosure can include only one power supply module, which reduces a volume of the door lock, and reduces the energy consumption caused by a plurality of power supply modules.

Optionally, the door lock further includes a timing module connected to the sensing module;
  wherein the sensing module is configured to send human body sensing information to the timing module when sensing that a human body is present within the first preset detection range; and configured to control the main controlling module and the unlocking module to be powered off when receiving timeout information sent by the timing module;
  the timing module is configured to determine whether the human body sensing information is received within a preset time period; and if no, the timing module is configured to the send timeout information to the sensing module.

In the door lock according to embodiments of the present disclosure, the timing module is adopted to ensure that the service life of devices such as modules, on the premise that the power consumption of the door lock is reduced.

Optionally, the door lock further includes a second switch connected between the timing module and the sensing module;
  wherein the sensing module is further configured to control the second switch to be closed when sensing that a human body is present within the first preset detection range, and configured to control the second switch to be open when receiving the timeout information.

Optionally, the timing module is further configured to record a first time point at which the human body sensing information is received by the timing module, and to search whether previous human body sensing information is received before the first time point; if yes, the timing module is configured to search for a second time point at which the previous human body sensing information is received, and determine whether a time difference between the first time point and the second time point is not greater than a time difference threshold; and if yes, the timing module is configured to send first information of the time difference being not greater than the time difference threshold to the sensing module;
  the sending module is further configured to send the first information to the main controlling module;
  the main controlling module is further configured to present the first information, wherein the first information includes information of the time difference between adjacent two times of unlocking the door being not greater than the time difference threshold.

The door lock according to embodiments of the present disclosure can further sense whether someone at the other side of the door lock is trying to unlock the door lock or has completed the unlocking of the door lock, and inform the current person who is trying to open the door and the former person tried to open the door, so as to avoid a fright or collision between them.

Optionally, the sensing module is further configured to determine whether a human body is present within a second preset detection range at the other side of the door lock when sensing that a human body is present within the first preset detection range; if yes, the sensing module is configured to send second information of a human body being present within the second preset detection range at the other side of the door lock to the main controlling module, wherein the other side of the door lock is opposite to the side where the current person who is trying to open the door is located;

the maim controlling module is further configured to present the second information, wherein the second information includes information of a human body being present within the second preset detection range at the other side of the door lock.

The door lock according to embodiments of the present disclosure can further detect whether there is someone within a certain distance from the door, and inform the current person who is trying to open the door and the former person who was trying to open the door in advance to avoid collision.

Optionally, the maim controlling module is further configured to determine whether a user is resting inside a room when receiving the unlocking instruction; if yes, the main controlling module is configured to present third information, wherein the third information includes information of the user being resting inside the room or do-not-disturb information set by the user.

Optionally, the main controlling module is configured to receive images captured by an image capturing device mounted inside the room, and determine whether the user is resting based on the images, or the main controlling module is configured to search whether the do-not-disturb information set by the user is pre-stored.

The door lock according to embodiments of the present disclosure can also have a function of presenting whether a user is resting inside the room to the person who is trying to unlock the door from outside, so as to prevent resting family or roommates from being disturbed by an action of the person entered the room.

Optionally, the sensing module includes at least one of a short-range capacitive sensing module, an infrared sensing module, and a human body sensing sensor.

Optionally, the unlocking module includes at least one of a password unlocking module, a voice unlocking module, a wireless unlocking module, a fingerprint unlocking module, and a door lock motor unlocking module.

In the door lock according to embodiments of the present disclosure, a variety of sensing modules are provided, and a variety of unlocking modules are provided for the person who is trying to open the door, which improves the flexibility of unlocking control of the door lock.

An embodiment of the present disclosure provides a door lock controlling method, which is applied to a door lock. The method includes:

determining whether a human body is present in a first preset detection range;

if no, controlling a main controlling module of the door lock and an unlocking module of the door lock to be powered off;

if yes, controlling the main controlling module of the door lock and the unlocking module of the door lock to be powered on.

Optionally, the controlling the main controlling module of the door lock and the unlocking module of the door lock to be powered on includes:

controlling a first switch connected to the main controlling module to be closed;

the controlling the main controlling module of the door lock and the unlocking module of the door lock to be powered off includes:

controlling the first switch connected to the main controlling module to be open.

Optionally, the method further includes:

when sensing that a human body is present within the first preset detection range, sending human body sensing information to a timing module of the door lock;

when receiving timeout information, controlling the main controlling module and the unlocking module to be powered off, wherein the timeout information is sent by the timing module when determining that the human body sensing information is not received in a preset time period.

Optionally, a second switch is connected between the main controlling module and the timing module, and the method further includes:

when sensing that a human body is present within the first preset detection range, controlling the second switch to be closed;

when receiving the timeout information, controlling the second switch to be open.

Optionally, the method further includes:

receiving first information sent by the timing module, wherein the first information is determined and sent by the timing module on the condition that the timing module records a first time point at which the human body sensing information is received by the timing module; the timing module searches whether previous human body sensing information is received before the first time point; if yes, the timing module searches for a second time point at which the previous human body sensing information is received by the timing module, and determines whether a time difference between the first time point and the second time point is not greater than the preset time difference threshold; if yes, the timing module sends the first information;

sending the first information to the main controlling module, so that the main controlling module presents the first information, wherein the first information includes information of the time difference between adjacent two times of unlocking the door being not greater than the time difference threshold.

Optionally, the method further includes:

determining whether a human body is present within a second preset detection range on other side of the door lock when sensing that a human body is present with the first preset detection range; if yes, sending second information of a human body being present within the second preset detection range at the other side of the door lock to the main controlling module, so that the main controlling module presents the second information, wherein the other side of the door lock is opposite to the side where the current person who is trying to open the door is located; the second information includes information of a human body being present within the second preset detection range at the other side of the door lock.

Optionally, the unlocking module includes at least one of a password unlocking module, a voice unlocking module, a wireless unlocking module, a fingerprint unlocking module, and a door lock motor unlocking module.

An embodiment of the present disclosure provides a door lock controlling device, which is applied to a door lock. The device includes:

a determining unit configured to determine whether a human body is present in a first preset detection range; and a controlling unit configured to control the door lock and control a main controlling module of the door lock and an unlocking module of the door lock to be powered off when a determination result obtained from the determining unit is no; and configured to control the main controlling module of the door lock and the unlocking module of the door lock to be powered on when the determination result obtained from the determining unit is yes.

The present disclosure provides the door lock, the door lock controlling method and the door lock controlling device. The door lock includes the main controlling module, the unlocking module, and the sensing module. The sensing module is configured to determine whether a human body is present within a first preset detection range; if yes, the main controlling module and the unlocking module are controlled to be powered on; and if no, the main controlling module and the unlocking module are controlled to be powered off. The sensing module of the present disclosure controls the main controlling module and the unlocking module to be powered off when sensing no human body is present within the first preset detection range, thereby ensuring that only the sensing module is in an operating state and other modules are not powered on when there is no user who is trying to open the door, on the premise of not affecting a normal control of the door lock. Therefore, the power consumption of the door lock is reduced.

BRIEF DESCRIPTION OF THE DRAWINGS

In order to more clearly illustrate technical solutions in embodiments of the present disclosure or prior art, the following drawings, which are to be referred in the description of the embodiments or prior art are briefly described below. Apparently, the drawings in the following description only illustrate some embodiments of the disclosure. For those of ordinary skill in the art, other drawings can be obtained according to the following drawings without creative work.

DETAILED DESCRIPTION

Embodiments of the present disclosure provide a door lock, a door lock controlling method and a door lock controlling device.

In order to make the objects, technical solutions, and advantages of the present disclosure more clear, the following optional detailed description of the disclosure will be made in conjunction with the accompanying drawings. Apparently, the described embodiments are only a part of the embodiments of the present disclosure, rather than all of them. Based on the embodiments in the present disclosure, all other embodiments obtained by those of ordinary skill in the art without creative work shall fall within the protection scope of the present disclosure.

Embodiment 1

Figure 1:
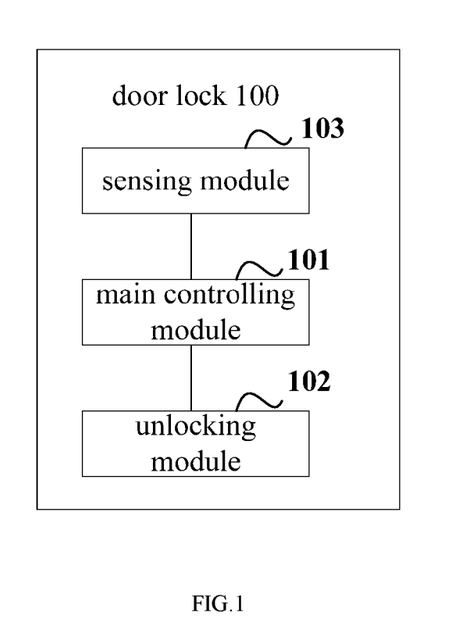
FIG. 1 is a schematic structural view of a door lock according to a first embodiment of the present disclosure.

FIG. 1 is a schematic structural view of a door lock 100 according to an embodiment of present disclosure. The door lock 100 includes a main controlling module 101, an unlocking module 102, and a sensing module 103.

The sensing module 103 is configured to determine whether a human body is present within a first preset detection range. If yes, the sensing module 103 controls the main controlling module 101 and the unlocking module 102 to be powered on. If no, the sensing module 103 controls the main controlling module 101 and the unlocking module 102 to be powered off.

The embodiment of the present disclosure provides the door lock. In addition to the main controlling module 101 and the unlocking module 102, the door lock further includes a sensing module 103 in order to reduce the power consumption of the smart door lock.

When the sensing module 103 senses that a human body is present within the first preset detection range, the sensing module 103 controls the main controlling module 101 and the unlocking module 102 to be powered on. When the sensing module 103 senses that no human body is present within the first preset detection range, the sensing module 103 controls the main controlling module 101 and the unlocking module 102 to be powered off. When there is no human body within the first preset detection range, only the sensing module 103 is in an operating state, and other modules are powered off. At this time, only the sensing module 103 consumes power, and the other modules do not have power consumption, so the power consumption of the door lock is greatly reduced.

When the sensing module 103 controls the main controlling module 101 and the unlocking module 102 to be powered on or powered off, the main controlling module 101 can be connected to the unlocking module 102. The sensing module 103 can control both the main controlling module 101 and the unlocking module 102 through the main controlling module 101 or the unlocking module 102. Take the sensing module 103 controlling the main controlling module 101 as an example, the door lock can include a first power supply module which supplies power to the sensing module 103 and a second power supply module which supplies power to the main controlling module 101, respectively. In this case, the sensing module 103 can control the main controlling module 101 by controlling whether the second power supply module supplies power. The door lock can also include a single power supply module that supplies power to every module. The single power supply module is connected to the sensing module 103. The sensing module 103 is connected to the main controlling module 101 through a switch. In this case, the sensing module 103 can control the main controlling module 101 by controlling the switch.

The first preset detection range is pre-stored in the sensing module 103. The first preset detection range can be pre-configured into the sensing module 103 before the door lock leaves the factory, or can be configured into the sensing module 103 by a user according to environment of the user's own building and usage habits. Generally, the first preset detection range is arbitrary, as long as it does not exceed a sensing range of the sensing module 103. For example, the sensing range of the sensing module 103 is 1 meter, a value representing the first preset detection range can be any value between 0 meter and 1 meter, such as 10 centimeters, 50 centimeters, 1 meter, etc. Generally, in order to prevent false triggering, the first preset detection range can be set to 30 centimeters.

The main controlling module 101 is connected to the unlocking module 102. The main controlling module 101 is configured to receive an unlocking instruction of a person trying to open the door sent by the unlocking module 102. The main controlling module 101 is configured to determine whether unlocking information carried in the unlocking instruction is consistent with target unlocking information that is pre-stored in the main controlling module 101. If yes, the main controlling module 101 controls the unlocking module 102 to unlock; if no, the unlocking module 102 is kept in a locked state.

When the sensing module 103 senses that a human body is present within the first preset detection range, the sensing module 103 controls the main controlling module 101 and the unlocking module 102 to be powered on, so that the main controlling module 101 and the unlocking module 102 are activated. The unlocking module 102 can receive the unlocking instruction input by the person who is trying to open the door. The unlocking instruction carries the unlocking information input by the person who is trying to open the door. The unlocking module 102 sends the unlocking instruction of the person who is trying to open the door to the main controlling module 101.

The target unlocking information is pre-stored in the main controlling module 101. The target unlocking information can be configured into the main controlling module 101 before the door lock leaves the factory, or can be configured into the main controlling module 101 by the user according to the user's own needs and habits.

After receiving the unlocking instruction sent by the unlocking module 102, the main controlling module 101 determines whether the unlocking information carried in the unlocking instruction is consistent with the target unlocking information that is pre-stored in the main controlling module 101. If yes, the main controlling module 101 controls the unlocking module 102 to unlock. If no, the main controlling module 101 does not control the unlocking module 102 to unlock, and the unlocking module 102 is kept in the locked state.

When the sensing module of the door lock in the embodiment of the present disclosure senses that no human body is present within the first preset detection range, the main controlling module and the unlocking module are controlled to be powered off, thereby ensuring that only the sensing module is in an operating state and other modules are not powered on when there is no person trying to open the door, on the premise of not affecting a normal control of the door lock. Therefore, the power consumption of the door lock is reduced.

Embodiment 2

Based on the above-described embodiment, in an embodiment of the present disclosure, the sensing module includes at least one of a short-range capacitive sensing module, an infrared sensing module, and a human body sensing sensor.

The unlocking module includes at least one of a password unlocking module, a voice unlocking module, a wireless unlocking module, a fingerprint unlocking module, and a door lock motor unlocking module.

The sensing module includes at least one of the short-range capacitive sensing module, the infrared sensing module, and the human body sensing sensor. It should be noted that a size and shape of the sensing module are not limited, as long as it can sense whether the human body is present.

The unlocking module includes at least one of the password unlocking module, the voice unlocking module, the wireless unlocking module, the fingerprint unlocking module, and the door lock motor unlocking module. The unlocking information carried in the unlocking instruction input by the person who is trying to open the door is associated with the unlocking module used by the person to input the unlocking instruction.

The password unlocking module is generally a digital password unlocking module. The wireless unlocking module is generally an unlocking module allowing the person trying to open the door to unlock through a door lock control application. The door lock motor unlocking module generally refers to a door lock handle.

The target unlocking information that the main controlling module adopts in making the determination corresponds to the unlocking information input by the person trying to open the door. For example, if the current person who wants to open the door inputs an unlocking instruction via the password unlocking module, the unlocking information carried in the unlocking instruction is password information. The main controlling module determines whether the password information input by the current person who wants to open the door is consistent with target password information that is pre-stored. If the current person who wants to open the door inputs an unlocking instruction via the voice unlocking module, the unlocking information carried in the unlocking instruction is voice information. The main controlling module determines whether the voice information input by the person who wants to open the door is consistent with target voice information that is pre-stored. If the current person who wants to open the door inputs an unlocking instruction via the wireless unlocking module, the unlocking information carried in the unlocking instruction is control unlocking information. The main controlling module determines whether the control unlocking information input by the current person who wants to open the door is consistent with target control unlocking information that is pre-stored. If the current person who wants to open the door inputs an unlocking instruction via the fingerprint unlocking module, the unlocking information carried in the unlocking instruction is fingerprint information. The main controlling module determines whether the fingerprint information input by the current person who wants to open the door is consistent with target fingerprint information that is pre-stored. If the current person who wants to open the door inputs an unlocking instruction via the door lock motor unlocking module, the unlocking information carried in the unlocking instruction is unlocking action information of the person who wants to open the door. The main controlling module determines whether the unlocking action information input by the current person who wants to open the door is consistent with target unlocking action information that is pre-stored.

In addition, the wireless unlocking module can also receive remote push of information input by the person who wants to open the door, and remotely generate ephemeral key, etc., so that when a guest comes and the owner is not at home, the owner can remotely generate and push the ephemeral key to the guest. The guest can input the ephemeral key to unlock the door lock, which reduces the waiting time of the guest.

In the embodiments of the present disclosure, a variety of sensing modules are provided, and a variety of unlocking modules are provided for the person who is trying to open the door, which improves the flexibility of unlocking control of the door lock.

Embodiment 3

Figure 2:
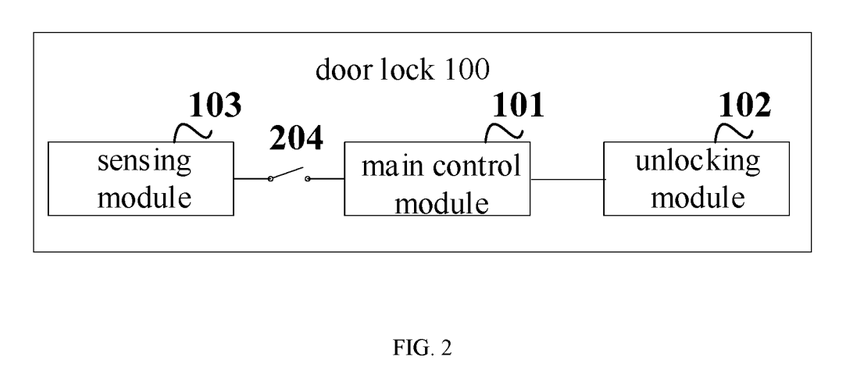
FIG. 2 is a schematic structural view of a door lock according to a third embodiment of the present disclosure.

Based on the above-described embodiments, in an embodiment of the present disclosure, as shown in FIG. 2, the door lock further includes a first switch 204 connected between the main controlling module 101 and the sensing module 103.

The sensing module 103 is specifically configured to control the first switch 204 to be closed when sensing that a human body is present within a first preset detection range, and configured to control the first switch 204 to be open when sensing that no human body is present within the first preset detection range.

The sensing module 103 can control the main controlling module 101 and the unlocking module 102 to be powered on or off by close or open the first switch 204. In this case, the door lock can include only one power supply module, which reduces a volume of the door lock and also reduces power consumption caused by having a plurality of power supply modules.

When sensing that a human body is present within the first preset detection range, the sensing module 103 controls the first switch 204 to be closed, thereby controlling the main controlling module 101 and the unlocking module 102 to be powered on. When sensing no human body is present within the first preset detection range, the sensing module 103 controls the first switch 204 to be open, thereby controlling the main controlling module 101 and the unlocking module 102 to be powered off.

FIG. 2 shows only one implementation of the first switch. The types and combination manners of switches that can be obtained by those skilled in the art and that can realize the switch control function should belong to extension embodiments of FIG. 2.

Embodiment 4

Figure 3:
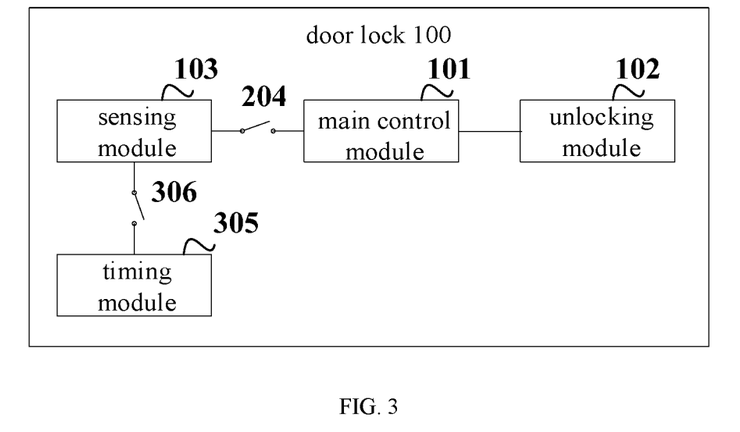
FIG. 3 is a schematic structural view of a door lock according to a fourth embodiment of the present disclosure.

Based on the above-described embodiments, in an embodiment of the present disclosure, the door lock further includes a timing module connected to the sensing module 103.

The sensing module 103 is specifically configured to send human body sensing information to the timing module when sensing that a human body is present within the first preset detection range, and configured to control the main controlling module 101 and the unlocking module 102 to be powered off when receiving timeout information sent by the timing module.

The timing module is configured to determine whether the human body sensing information is received within a preset time period, and if no, the timing module sends timeout information to the sensing module 103.

As shown in FIG. 3, the door lock includes the timing module 305. The door lock further includes a second switch 306 connected between the timing module 305 and the sensing module 103.

The sensing module 103 is further configured to control the second switch 306 to be closed when sensing that a human body is present within the first preset detection range, and configured to control the second switch 306 to be open when receiving the timeout information.

In order to avoid damage to the main controlling module and the unlocking module in the door lock caused by multiple power-on and power-off control operations in a short period of time, the sensing module 103 can adopt the timing module 305 in the controlling of the modules in the door lock.

When sensing that a human body is present within the first preset detection range, the sensing module 103 sends the human body sensing information to the timing module, and controls the main controlling module 101 and the unlocking module 102 to be powered on. When sensing that no human body is present within the first preset detection range, the sensing module 103 does not send the human body sensing information to the timing module. The timing module determines whether the human body sensing information is received within the preset time period. If no, the timing module sends the timeout information to the sensing module 103, and the sensing module 103 controls the main controlling module 101 and the unlocking module 102 to be powered off.

In order to further reduce the power consumption of the door lock, the second switch 306 is connected between the timing module 305 and the sensing module 103. When sensing that a human body is present within the first preset detection range, the sensing module 103 controls the main controlling module, the unlocking module, and the timing module 305 to be powered on. When sensing that no human body is present in the first preset detection range, the sensing module 103 controls the main controlling module, the unlocking module, and the timing module 305 to be powered off. Specifically, when sensing that a human body is present within the first preset detection range, the sensing module 103 controls the first switch 204 between the sensing module 103 and the main controlling module to be closed, controls the second switch 306 between the sensing module 103 and the timing module 305 to be closed, and sends the human body sensing information to the timing module 305, so that the timing module 305 acquires the human body sensing information that is present and sensed currently. The human body sensing information is information about the current person who is trying to open the door.

In the step that the timing module determines whether the human body sensing information sent by the sensing module is received within the preset time period, the timing module 305 resets current timing data and restarts a new timing when receiving the human body sensing information sent by the sensing module 103, and determines whether the time period after the restart of the timing reaches the preset time period. Alternatively, in the step that the timing module determines whether the human body sensing information sent by the sensing module is received within the preset time period, the timing module 305 calculates a time difference between the current time and the time when the latest human body sensing information was received, and determines whether the time difference reaches the preset time period. The timing module 305 also stores the preset time period. The preset time period can be set into the timing module 305 before the door lock leaves the factory, or set into the timing module 305 by the user according to the user's own needs and usage habits. The preset time period can be any time period. If the user wants to reduce the power consumption of the door lock as much as possible, the preset time period can be set shorter. Usually, the preset time period can be 5 minutes, 10 minutes, 1 hour, or the like.

When the timing module 305 receives the human body sensing information within the preset time period, the timing module 305 does not send the timeout information to the sensing module 103. When the timing module 305 does not receive the human body sensing information within the preset time period, the timing module 305 sends the timeout information to the sensing module 103, so as to inform the sensing module 103 that there is no user who is trying to open the door for a long time. After the sensing module 103 receives the timeout information, the sensing module 103 can open the first switch 204 and the second switch 306 to reduce the power consumption of the door lock.

The embodiments of the present disclosure adopt the timing module to improve the service life of devices such as the switches and the modules on the premise of reducing the power consumption of the door lock.

The first switch and the second switch can be the same or different. FIG. 3 shows only one embodiment of the second switch. The type and combination manners of switches that can be obtained by those skilled in the art and can realize the switch control function should belong to extension embodiments of FIG. 3.

Embodiment 5

Based on the above-described embodiments, in an embodiment of the present disclosure, the timing module is further configured to record a first time point at which the human body sensing information is received by the timing module, and the timing module is configured to search whether previous human body sensing information is received before the first time point. If yes, the timing module is configured to search for a second time point at which the previous human body sensing information is received, and determine whether a time difference between the first time point and the second time point is not greater than a preset time difference threshold. If yes, the timing module is configured to send first information of the time difference being not greater than the time difference threshold to the sensing module.

The sensing module is further configured to send the first information to the main controlling module.

The main controlling module is further configured to present the first information. The first information includes information of the time difference between adjacent two times of unlocking the door being not greater than the time difference threshold.

The door lock can sense whether someone inside or outside the room is trying to unlock the door lock or has completed the unlocking of the door lock, and inform the current person who is trying to open the door and the former person tried to open the door, so as to avoid a fright or collision between them.

When the timing module receives the human body sensing information sent by the sensing module, the timing module records the time at which it receives the human body sensing information as the first time point. Therefore, the timing module stores the receiving time of each human body sensing information.

After recording the first time point, the timing module searches whether the previous human body sensing information is received before the first time point. If yes, the timing module searches for the recorded second time point of the previous human body sensing information, and determines whether the time difference between the first time point and the second time point is not greater than the preset time difference threshold. If yes, it means that there was a person who tried to open the door shortly before the current person who is trying to open the door. The timing module sends the first information of the time difference between the first time point and the second time point being not greater than the time difference threshold to the sensing module. The sensing module forwards the first information to the main controlling module. The main controlling module can present the first information to the former person who tried to open the door and/or the current person who is trying to open the door. The first information includes information of the time difference at adjacent two times of unlocking the door being not greater than the time difference threshold, so as to inform the former person and/or the current person that there is another person who is trying/tried to open the door at an adjacent time, so as to avoid fright and collision between them.

If the timing module did not receive the previous human body sensing information before the first time point, the timing module does not send the first information to the sensing module. If the timing module received the previous human body sensing information before the first time point, and determines that the time difference between the first time point and the second time point is greater than the time difference threshold, the timing module does not send the first information to the sensing module.

The time difference threshold is pre-stored in the timing module. The time difference threshold can be pre-configured into the timing module before the door lock leaves the factory, or configured into the timing module by the user according to the user's own needs and usage habits.

The main controlling module can present the first information to the former person who tried to open the door, so as to inform the former person to take avoidance in time. The main controlling module can present the first information to the current person who is trying to open the door, so as to inform the current person to avoid hitting somebody, in an embodiment, inform the former person and the current person at the same time.

The main controlling module can present the first information by flashing indicator light, flashing a door handle, displaying text, or the like.

Since the timing module has the above-described time recording function and the logic functions of time difference calculation and determination, the timing module can include a timing circuit and can also include a logic unit and a storage unit to complete the time recording and the time difference determination.

The door lock in the embodiments of the present disclosure can also sense whether someone tried to unlock the door lock or has completed unlocking of the door lock at the other side of the door lock with respect to the side where the current person who is trying to open the door is located, and inform the current person and the former person in advance, so as to avoid a fright or collision between them.

Embodiment 6

Based on the above-described embodiments, in an embodiment of the present disclosure, the sensing module is further configured to determine whether a human body is present within a second preset detection range at the other side of the door lock when sensing that a human body is present within the first preset detection range. If yes, the sensing module is configured to send second information of a human body being present within the second preset detection range at the other side of the door lock to the main controlling module. The other side of the door lock is opposite to the side where the current person who is trying to open the door is located.

The main controlling module is further configured to present the second information. The second information includes information of a human body being present within the second preset detection range at the other side of the door lock.

The door lock can also detect whether there is someone within a certain distance from the other side of the door lock with respect to the side where the current person who is trying to open the door is located, and inform the current person in advance to avoid collision.

When the sensing module senses that a human body is present in the first preset detection range, it determines whether a human body is present in the second preset detection range at the other side of the door lock. If yes, the second information of a human body being present in the second preset detection range at the other side of the door lock is sent to the main controlling module. The main controlling module presents the second information to the current person who is trying to open the door. The second information includes information of a human body being present within the second preset detection range at the other side of the door lock to inform the current person that there is someone at the other side of the door lock, so as to avoid collision.

When the sensing module senses that no human body is present within the first preset detection range, it does not send the second information to the main controlling module. When the sensing module senses that a human body is present within the first preset detection range, and no human body is present within the second preset detection range at the other side of the door lock, it does not send the second information to the main controlling module.

The second preset detection range is pre-stored in the sensing module. The second preset detection range can be pre-configured into the sensing module before the door lock leaves the factory, or it can be configured into the sensing module by the user according to the environment of the user's own building and usage habits. Generally, the second preset detection range is arbitrary, as long as it does not exceed the sensing range of the sensing module. For example, the sensing range of the sensing module is 1 meter, and a value representing the second preset detection range can be any value between 0 meter to 1 meter, such as 10 centimeters, 50 centimeters, 1 meter, etc. The first preset detection range and the second preset detection range can be the same or different. Since the second preset detection range is set to avoid collision, the second preset detection range and the first preset detection range can be different, and the second preset detection range is greater than the first preset detection range. The first preset detection range can be set to 1 meter.

The main controlling module can present the second information by flashing indicator light, flashing a door handle, displaying text, or the like.

The door lock in the embodiments of the present disclosure can also detect whether someone is within a certain distance from the other side of the door lock with respect to the side where the current person who wants to open the door is located, and inform the current person who wants to open the door in advance, so as to avoid collision.

Embodiment 7

Based on the above-described embodiments, in an embodiment of the present disclosure, the main controlling module is further configured to determine whether a user is resting inside the room when receiving the unlocking instruction. If yes, the main controlling module is configured to present third information. The third information includes information of the user being resting inside the room or do-not-disturb (DND) information set by the user.

Specifically, the main controlling module can be configured to receive images captured by an image capturing device mounted inside the room, and determine whether the user is resting based on the images; or the main controlling module can be configured to search whether the do-not-disturb information set by the user is pre-stored.

The door lock can also have a function of presenting whether a user is resting inside the room to the person who is trying to unlock the door from outside, so as to prevent disturbing resting family or roommates by actions of the person who enters the room.

When the main controlling module receives the unlocking instruction sent by the unlocking module, the main controlling module can determine whether a user is resting in the room. If yes, the main controlling module presents the third information to the current person who is trying to open the door. If no, the main controlling module does not present the third information to the current person who is trying to open the door.

The main controlling module can present the third information by flashing indicator light, flashing a door handle, displaying text, or the like. The presenting method is the same as or different from the above-described presenting methods. An embodiment of a presenting method is different from the above-described presenting methods. When the presenting method is the same as the above-described presenting methods, information that is presented is different.

When the main controlling module determines whether a user is resting in the room, the main controlling module can be linked with devices in rooms in the building to receive images captured by image capturing devices mounted inside the building, and determine whether a user is resting based on the images. Alternatively, the image capturing device detects whether a user is resting after capturing the images, and sends the detection result to the main controlling module. The image capturing device can also be replaced with a sensor, etc. The determination of whether a user is resting is made based on sensing information collected by the sensor. In this case, the third information includes information of the user being resting inside the building.

Optionally, the door lock has a special setting mode to record status of a user inside a room. For example, the user sets the DND information in the door lock before resting. When the main controlling module searches the pre-stored DND information set by the user, the main controlling module determines that the user is resting. If the main controlling module does not search the pre-stored DND information, it determines that no user is resting. In this case, the third information includes the DND information set by the user.

In the embodiment of the present disclosure, the door lock can also have a function of presenting that whether a user is resting inside the building to the person who is trying to unlock the door from outside, so as to prevent disturbing resting family or roommates by actions of the person who enters the building.

Embodiment 8

Figure 4:
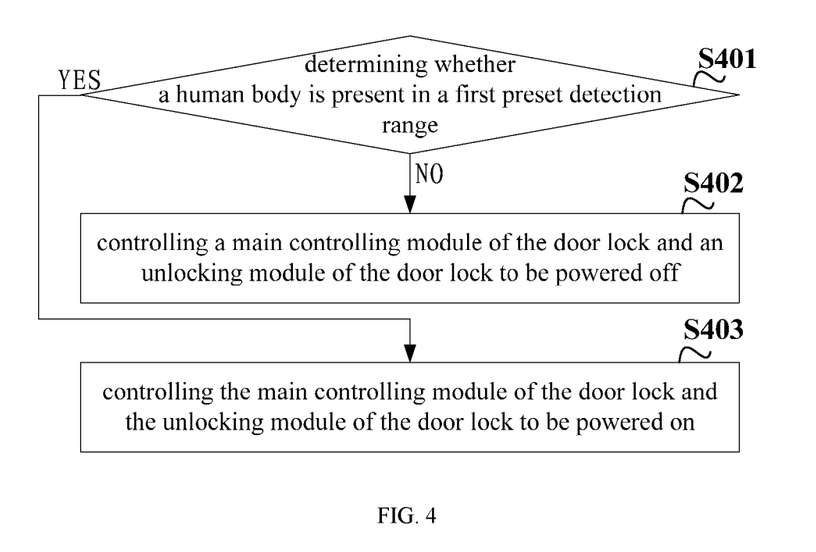
FIG. 4 is a schematic view of a door lock controlling method according to an embodiment of the present disclosure.

Based on the above-described embodiments, FIG. 4 is a schematic view of a door lock controlling method according to an embodiment of present disclosure, which includes the following steps:

S401: determining whether a human body is present in a first preset detection range; if no, proceeding S402; if yes, proceeding S403.

The door lock controlling method according to an embodiment of the present disclosure is applied to a door lock, particularly to the sensing module of the door lock. The sensing module includes at least one of a short-range capacitive sensing module, an infrared sensing module, and a human body sensing sensor.

S402: controlling a main controlling module of the door lock and an unlocking module of the door lock to be powered off.

S403: controlling the main controlling module of the door lock and the unlocking module of the door lock to be powered on.

The main controlling module is connected to the unlocking module. The sensing module can control the main controlling module and the unlocking module to be powered on or off.

The unlocking module includes at least one of a password unlocking module, a voice unlocking module, a wireless unlocking module, a fingerprint unlocking module, and a door lock motor unlocking module.

The main controlling module receives the unlocking instruction of a current person who is trying to open the door. The unlocking instruction is sent by the unlocking module connected to the main controlling module. The main controlling module determines whether the unlocking information carried in the unlocking instruction is consistent with the target unlocking information that is pre-stored. When the main controlling module determines that the unlocking information is consistent with the target unlocking information, the main controlling module controls the unlocking module to unlock. When the main controlling module determines that the unlocking information is inconsistent with the target unlocking information, the main controlling module controls the unlocking module to be kept in a locked state.

When the sensing module of the door lock in the embodiment of the present disclosure senses that no human body is present within the first preset detection range, the sensing module controls the main controlling module and the unlocking module to be powered off, thereby ensuring that only the sensing module is in an operating state and other modules are not powered on when there is no person trying open the door, on the premise of not affecting a normal control of the door lock. Therefore, the power consumption of the door lock is reduced.

Embodiment 9

Based on the above-described embodiments, in an embodiment of the present disclosure, the controlling the main controlling module of the door lock and the unlocking module of the door lock to be powered on includes:
controlling a first switch connected to the main controlling module to be closed;
the controlling the main controlling module of the door lock and the unlocking module of the door lock to be powered off includes:
controlling the first switch connected to the main controlling module to be open.

Optionally, the method further includes:
when sensing that a human body is present within the first preset detection range, sending human body sensing information to a timing module of the door lock;
when receiving timeout information, controlling the main controlling module and the unlocking module to be powered off, wherein the timeout information is sent by the timing module when determining that the human body sensing information is not received in a preset time period.

Optionally, the second switch is connected between the main controlling module and the timing module, and the method further includes:
when sensing that a human body is present within the first preset detection range, controlling the second switch to be closed;
when receiving the timeout information, controlling the second switch to be open.

Optionally, the method further includes:
receiving first information sent by the timing module, wherein the first information is determined and sent by the timing module on the condition that the timing module records a first time point at which the human body sensing information is received by the timing module; the timing module searches whether previous human body sensing information is received before the first time point; if yes, the timing module searches for a second time point at which the previous human body sensing information is received by the timing module, and determines whether a time difference between the first time point and the second time point is not greater than the preset time difference threshold; if yes, the timing module sends the first information;
sending the first information to the main controlling module, so that the main controlling module presents the first information, wherein the first information includes information of the time difference between adjacent two times of unlocking the door being not greater than the time difference threshold.

Optionally, the method further includes:
determining whether a human body is present within a second preset detection range on other side of the door lock when sensing that a human body is present within the first preset detection range; if yes, sending second information of a human body being present within the second preset detection range at the other side of the door lock to the main controlling module, so that the main controlling module presents the second information, wherein the other side of the door lock is the side of the door lock that is opposite to where the current person who is trying to open the door is located, the second information includes information of a human body being present within the second preset detection range at the other side of the door lock.

Optionally, the main controlling module is further configured to determine whether a user is resting inside the room when receiving the unlocking instruction of the current person who is trying to open the door. If yes, the main controlling module presents third information, wherein the third information includes information of the user being resting inside the room or do-not-disturb (DND) information set by the user.

The main controlling module is specifically configured to receive images captured by an image capturing device mounted inside the room, and determine whether the user is resting based on the images, or
configured to search whether DND information set by the user is pre-stored in advance.

The door lock in the embodiment of the present disclosure informs the current person who is trying to open the door in advance, so as to prevent the user who is resting inside the room from being frightened or hit and disturbed.

Figure 5:
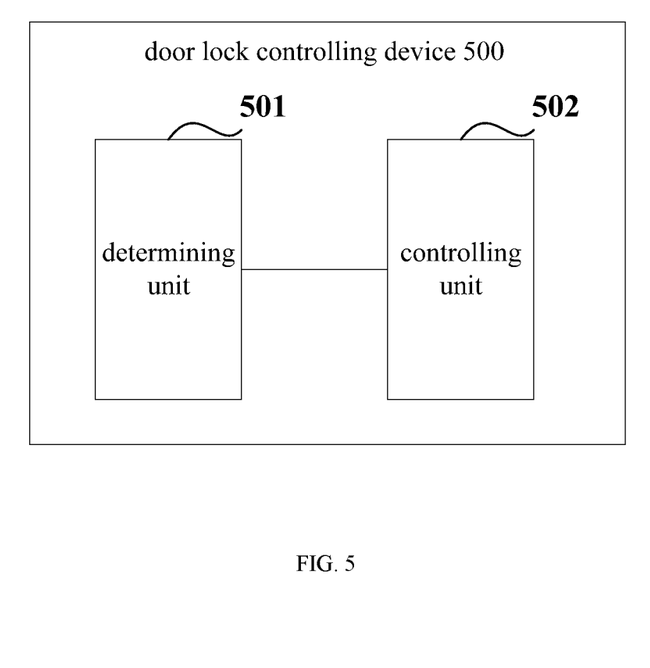
FIG. 5 is a schematic view of a door lock controlling device according to an embodiment of the present disclosure.

FIG. 5 is a schematic view of a door lock controlling device 500 according to an embodiment of present disclosure, which is applied to the door lock. The device includes:

a determining unit 501 configured to determine whether a human body is present in a first preset detection range; and a controlling unit 502 configured to control the door lock and control a main controlling module of the door lock and an unlocking module of the door lock to be powered off when a determination result obtained from the determining unit 501 is no, and configured to control the main controlling module of the door lock and the unlocking module of the door lock to be powered on when a determination result obtained from the determining unit 501 is yes.

The controlling unit is specially configured to control the first switch connected to the main controlling module to be open when the determination result from the determining unit is no, and configured to control the first switch connected to the main controlling module to be open when the determination result from the determining unit is yes.

The controlling unit is further configured to send human body sensing information to the timing module of the door lock when sensing that a human body is present within the first preset detection range, and configured to control the main controlling module and the unlocking module to be powered off when receiving timeout information, wherein the timeout information is sent by the timing module when determining that the human body sensing information is not received in a preset time period.

A second switch is connected between the main controlling module and the timing module. The controlling unit is further configured to control the second switch to be closed when sensing that a human body is present within the first preset detection range, and configured to control the second switch to be open when receiving the timeout information.

The controlling unit is further configured to receive first information sent by the timing module, wherein the first information is determined and sent by the timing module on the condition that the timing module records a first time point at which the human body sensing information is received by the timing module; the timing module searches whether previous human body sensing information is received before the first time point; if yes, the timing module searches for a second time point at which the previous human body sensing information is received by the timing module, and determines whether a time difference between the first time point and the second time point is not greater than the preset time difference threshold; if yes, the timing module sends the first information. The controlling unit is further configured to send the first information to the main controlling module, so that the main controlling module presents the first information, wherein the first information includes information of the time difference between adjacent two times of unlocking the door being not greater than the time difference threshold.

The controlling unit is further configured to determine whether a human body is present within a second preset detection range on other side of the door lock when sensing that a human body is present within the first preset detection range. If yes, the controlling unit sends second information of a human body being present within the second preset detection range at the other side of the door lock to the main controlling module, so that the main controlling module presents the second information, wherein the other side of the door lock is opposite to the side where the current person who is trying to open the door is located. The second information includes information of a human body being present within the second preset detection range at the other side of the door lock.

The unlocking module includes at least one of a password unlocking module, a voice unlocking module, a wireless unlocking module, a fingerprint unlocking module, and a door lock motor unlocking module.

When the sensing module of the door lock in the embodiment of the present disclosure senses that no human body is present within the first preset detection range, the sensing module controls the main controlling module and the unlocking module to be powered off, thereby ensuring that only the sensing module is in an operating state and other modules are not powered on when there is no person trying to open the door, on the premise of not affecting a normal control of the door lock. Therefore, the power consumption of the door lock is reduced.

For embodiments describing the system/device, since they are basically similar to the embodiments describing the method, the descriptions thereof are relatively simple, and related descriptions thereof can be referred to the descriptions of the embodiments describing the method.

An embodiment of the present disclosure provides a storage medium. The storage medium includes a program that is stored thereon. An apparatus having the storage medium is controlled to perform the above-described door lock controlling method when the program is executed.

Optionally, in the present embodiment, the storage medium is configured to store program codes to execute the following steps: determining whether a human body is present within a first preset detection range; if no, controlling the main controlling module of the door lock and the unlocking module of the door lock to be powered off; and if yes, controlling the main controlling module of the door lock and the unlocking module of the door lock to be powered on.

Optionally, in the present embodiment, the storage medium can be further configured to store program codes to execute various optional steps provided in the door lock controlling method.

An embodiment of the present disclosure provides a processor. The processor is configured to execute a program. The above-described door lock controlling method is executed when the program is executed.

Each of the functional modules provided in the embodiments of the present disclosure can be operated in the door lock or similar computing device, or can be stored as a part on the storage medium.

Accordingly, an embodiment of the present disclosure provides a door lock.

In the present embodiment, the above-described door lock is configured to execute program codes for performing the following steps in the door lock controlling method: determining whether a human body is present within a first preset detection range; if no, controlling the main controlling module of the door lock and the unlocking module of the door lock to be powered off; and if yes, controlling the main controlling module of the door lock and the unlocking module of the door lock to be powered on.

Optionally, the door lock can include one or more processors, memories, and transmitting devices.

The memory can be configured to store software programs and modules, such as program instructions/modules corresponding to the door lock controlling method and the door lock controlling device in the embodiments of the present disclosure. By executing software programs and modules stored on the memory, the processor performs various functional applications and data processing, that is, performs the above-described door lock controlling method. The memory can include a high-speed random access memory, and can also include a non-transitory memory, such as one or more magnetic storage devices, flash memories, or other non-transitory solid-state memories. In some examples, the memory can further include a memory remotely provided with respect to the processor. Such remote memories can be connected to a terminal through a network. Examples of the network include, but are not limited to, Internet, corporate intranets, local area networks, mobile communication networks, and combinations thereof.

The above-described transmitting device is configured to receive or transmit data via a network. The specific examples of the network can include a wired network and a wireless network. In an example, the transmitting device includes a Network Interface Controller (NIC), which can be connected to other network devices and routers through a network cable, so as to communicate with Internet or local area network. In an example, the transmitting device is a Radio Frequency (RF) module, which is configured to communicate with the Internet in a wireless manner.

Specifically, the memory is configured to store the first preset detection range, the preset time period, the time difference threshold, and application programs.

The processor can call the information and application programs stored in the memory through the transmitting device to execute the program codes of the method steps of each optional embodiment in the above-described embodiments describing the method.

Those skilled in the art should understand that the embodiments of the present disclosure can be provided in the forms of methods, systems, or computer program products. Therefore, the embodiments of the present disclosure can adopt only hardware, adopt only software, or a combination of software and hardware. Moreover, the present disclosure can adopt a form of a computer program product implemented on one or more computer-available storage media (including but not limited to disk storage, CD-ROM, optical storage, etc.) including computer-available program codes.

The present disclosure is described with reference to flowcharts and/or block diagrams of methods, devices (systems), and computer program products according to embodiments of the present disclosure. It should be understood that each step and/or block in the flowchart and/or block diagram, and the combination of steps and/or blocks in the flowchart and/or block diagram can be implemented by computer program instructions. Such computer program instructions can be provided to a processor of a general-purpose computer, a special-purpose computer, an embedded processor, or other programmable data processing device to produce a machine, such that the instructions executed by the processor of the computer or other programmable data processing device are used to produce a device that realizes the functions specified in one or more processes in the flowchart and/or one or more blocks in the block diagram.

Such computer program instructions can also be stored in a computer-readable memory that can direct a computer or other programmable data processing device to operate in a specific manner, such that the instructions stored in the computer-readable memory produce an article of manufacture including an instruction device. The instruction device realizes the functions specified in one or more processes in the flowchart and/or one or more blocks in the block diagram.

Such computer program instructions can also be loaded on a computer or other programmable data processing device, such that a series of operation steps are carried out on the computer or other programmable device to generate a processing that is implemented by the computer, such that the instructions executed on the computer or other programmable device provide steps for realizing functions specified in one or more processes in the flowchart and/or one or more blocks in the block diagram.

Although the embodiments of the present disclosure have been described, those skilled in the art can make additional changes and modifications to these embodiments once they learn the basic creative concept. Therefore, the appended claims are intended to be interpreted as including the embodiments and all changes and modifications falling within the scope of this disclosure.

Apparently, those skilled in the art can make various changes and modifications to the disclosure without departing from the spirit and scope of the disclosure. In this way, if these modifications and variations of this disclosure fall within the scope of the claims of this disclosure and their equivalent technologies, this disclosure is also intended to include these modifications and variations.

Industry Significance

The technical solutions according to embodiments of the present disclosure can be applied to an operating process of a door lock, and a following technical solution is adopted: whether a human body is present within a first preset detection range is determined; if no, a main controlling module of the door lock and an unlocking module of the door lock are controlled to be powered off; and if yes, the main controlling module of the door lock and the unlocking module of the door lock are control to be powered on. Therefore, it is ensured that only a sensing module is in an operating state and other modules are not powered on when there is no user who is trying to open the door, on the premise of not affecting a normal control of the door lock. Therefore, the power consumption of the door lock is reduced.

What is claimed is:
1. A door lock, comprising:
a main controlling module;
an unlocking module;
a sensing module; and
a timing module connected to the sensing module;
wherein the sensing module is configured to:
   a) determine, by the sensing module, whether a human body is present within a first preset detection range;
   b) in response to determining, by the sensing module, that a human body is present within the first preset detection range:
      i) transmit, by the sensing module, a signal that causes the main controlling module and the unlocking module to be powered on; and
      ii) send, by the sensing module, human body sensing information to the timing module while sensing that the human body is present within the first preset detection range; and
   c) in response to receiving, by the sensing module, timeout information sent by the timing module that represents a determination that a human body is not present within the first preset detection range within a preset time period, control transmit, by the sensing module, a signal that causes the main controlling module and the unlocking module to be powered off; and wherein the timing module is configured to:
- a) record a first time point at which the human body sensing information is received by the timing module;
- b) search whether previous human body sensing information was received before the first time point; and
- c) in response to determining that previous human body sensing information was received before the first time point:
  - i) search for a second time point at which the previous human body sensing information was received; and
  - ii) in response to determining that a time difference between the first time point and the second time point is not greater than a time difference threshold, send first information to the sensing module, wherein the first information indicates that the time difference between adjacent two times of unlocking the door is not greater than the time difference threshold;

wherein the sensing module is further configured to send the first information to the main controlling module; and wherein the main controlling module is configured to present the first information for communicating that another person opened or tried to open the door to avoid fright or collision between them.

2. The door lock according to claim 1, wherein the main controlling module is connected to the unlocking module, and wherein the main controlling module is configured to:
receive, by the main controlling module, an unlocking instruction of a person who is trying to open a door sent by the unlocking module;
determine, by the main controlling module, whether unlocking information carried in the unlocking instruction is consistent with target unlocking information that is pre-stored in the main controlling module;
in response to determining, by the main controlling module, that the unlocking information carried in the unlocking instruction is consistent with the target unlocking information that is pre-stored in the main controlling module, control, by the main controlling module, the unlocking module to unlock; and
in response to determining, by the main controlling module, that the unlocking information carried in the unlocking instruction is not consistent with the target unlocking information that is pre-stored in the main controlling module, keep, by the main controlling module, the unlocking module in a locked state.

3. The door lock according to claim 1, wherein the door lock further comprises a first switch connected between the main controlling module and the sensing module;
wherein the sensing module is specifically configured to control the first switch to be closed when sensing that the human body is present within the first preset detection range, and to control the first switch to be open when sensing that no human body is present within the first preset detection range.

4. The door lock according to claim 1, wherein the door lock further comprises a second switch connected between the timing module and the sensing module,
wherein the sensing module is further configured to control the second switch to be closed when sensing that the human body is present within the first preset detection range, and configured to control the second switch to be open when receiving the timeout information.

5. The door lock according to claim 1, wherein the sensing module is further configured to:
determine, by the sensing module, whether another human body is present within a second preset detection range at another side of the door lock when sensing that the human body is present within the first preset detection range;
in response to determining, by the sensing module, that another human body is present within the second preset detection range at an other side of the door lock when sensing that the human body is present within the first preset detection range, send, by the sensing module, second information of the other human body being present within the second preset detection range at the other side of the door lock to the main controlling module, wherein the other side of the door lock is opposite to a side where the sensed human body present within the first preset detection range is located; and
the main controlling module is further configured to:
present, by the main controlling module, the second information, wherein the second information comprises information of the other human body being present within the second preset detection range at the other side of the door lock.

6. The door lock according to claim 1, wherein the main controlling module is further configured to:
determine, by the main controlling module, whether a user is resting inside a room when receiving an unlocking instruction; and
in response to determining, by the main controlling module, that the user is resting inside the room when receiving the unlocking instructions, present, by the main controlling module, third information, wherein the third information comprises information of the user being resting inside the room or do-not-disturb information set by the user.

7. The door lock according to claim 6, wherein the main controlling module is configured to:
receive, by the main controlling module, images captured by an image capturing device mounted inside the room, and determine, by the main controlling module, whether the user is resting based on the images, or
search, by the main controlling module, whether the do-not-disturb information set by the user is pre-stored.

8. The door lock according to claim 1, wherein the sensing module comprises at least one of a short-range capacitive sensing module, an infrared sensing module, and a human body sensing sensor.

9. The door lock according to claim 1, wherein the unlocking module comprises at least one of a password unlocking module, a voice unlocking module, a wireless unlocking module, a fingerprint unlocking module, and a door lock motor unlocking module.

10. A door lock controlling method applied to a door lock, the method comprising:
determining, by a sensing module, whether a human body is present in a first preset detection range;
in response to receiving, by the sensing module, timeout information from a timing module that represents a determination that a human body is not present within the first preset detection range for a preset time period, transmitting, by the sensing module, a signal that causes a main controlling module of the door lock and an unlocking module of the door lock to be powered off; and in response to determining, by the sensing module, that a human body is present within the first preset detection range:
  transmitting, by the sensing module, a signal that causes the main controlling module of the door lock and the unlocking module of the door lock to be powered on;
  while sensing, by the sensing module, that the human body is present within the first preset detection range, sending, by the sensing module, human body sensing information to the timing module of the door lock;
wherein the timeout information is sent by the timing module in response to determining that the human body sensing information is not received in the preset time period;
receiving, by the sensing module, first information from the timing module, wherein the first information comprises information of a time difference between adjacent two times of unlocking the door being not greater than a time difference threshold; and
sending, by the sensing module, the first information to the main controlling module for presentation of the first information by the main controlling module for communicating that another person opened or tried to open the door to avoid fright or collision between them.

11. The method according to claim 10, wherein transmitting the signal that causes the main controlling module of the door lock and the unlocking module of the door lock to be powered on comprises:
  transmitting a signal that causes a first switch connected to the main controlling module to be closed; and
  wherein transmitting the signal that causes the main controlling module of the door lock and the unlocking module of the door lock to be powered off comprises:
    transmitting a signal that causes the first switch connected to the main controlling module to be open.

12. The method according to claim 10, wherein a second switch is connected between the main controlling module and the timing module, and the method further comprises:
  in response to sensing that the human body is present within the first preset detection range, transmitting a signal that causes the second switch to be closed; and
  in response to receiving the timeout information, transmitting a signal that causes the second switch to be open.

13. The method according to claim 10, wherein the method further comprises:
  recording, by the timing module, a first time point at which the human body sensing information is received by the timing module;
  searching, by the timing module, whether previous human body sensing information is received before the first time point;
  in response to determining, by the timing module, that previous human body sensing information was received before the first time point:
    searching, by the timing module, for a second time point at which the previous human body sensing information is received;
    determining, by the timing module, whether a time difference between the first time point and the second time point is not greater than a time difference threshold; and
    in response to determining, by the timing module, that the time difference between the first time point and the second time point is not greater than the time difference threshold, sending, by the timing module, the first information of the time difference being not greater than the time difference threshold to the sensing module.

14. The method according to claim 10, wherein the method further comprises:
  determining, by the sensing module, whether another human body is present within a second preset detection range at other side of the door lock when sensing that the human body is present with the first preset detection range,
  in response to determining, by the sensing module, that another human body is present within the second preset detection range at an other side of the door lock when sensing that the human body is present within the first preset detection range, sending, by the sensing module, second information of the other human body being present within the second preset detection range at the other side of the door lock to the main controlling module for presentation of the second information by the main controlling module, wherein the other side of the door lock is opposite to a side where the sensed human body present within the first preset detection range is located;
  wherein the second information comprises information of the other human body being present within the second preset detection range at the other side of the door lock.

15. The method according to claim 10, wherein the unlocking module comprises at least one of a password unlocking module, a voice unlocking module, a wireless unlocking module, a fingerprint unlocking module, and a door lock motor unlocking module.

16. A door lock comprising:
  a processor; and
  a memory connected to the processor, wherein the memory storing a program configured to be executed by the processor, and the processor executes the method of claim 10 while the program being executed.

* * * * *